(12) United States Patent
Bin

(10) Patent No.: US 8,781,986 B2
(45) Date of Patent: Jul. 15, 2014

(54) CONSTRAINT SATISFACTION PROBLEM SOLVING USING CONSTRAINT SEMANTICS

(75) Inventor: Eyal Bin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 13/290,092

(22) Filed: Nov. 6, 2011

(65) Prior Publication Data

US 2013/0117215 A1   May 9, 2013

(51) Int. Cl.
G06N 5/02   (2006.01)
G06N 5/00   (2006.01)

(52) U.S. Cl.
CPC ............ *G06N 5/003* (2013.01); *G06F 2217/06* (2013.01)
USPC .......................................................... 706/46

(58) Field of Classification Search
None
See application file for complete search history.

(56) References Cited

U.S. PATENT DOCUMENTS

| 5,410,496 | A * | 4/1995 | Bolon et al. | 703/7 |
| 2010/0057518 | A1 * | 3/2010 | Naveh et al. | 705/9 |

OTHER PUBLICATIONS

Bin, E. et al.; "Using a constraint satisfaction formulation and solution techniques for random test program generation"; 2002; IBM Systems Journal, vol. 41, No. 3; pp. 386-402.*
Frost, Daniel et al.; "Look-ahead value ordering for constraint satisfaction problems"; 1995; IJCA (1); pp. 572-578.*
Bessiere, Christian et al.; "MAC and Combined Heuristics: Two Reasons to Forsake FC (and CBJ?) on Hard Problems"; 1996; Springer Berlin Heidelberg; Principles and Practice of Constraint Programming-CP96; pp. 61-75.*
Rina Dechter, "Constraint processing", A book by Elsevier Science (USA), pp. 137-138,140, 2003.

* cited by examiner

*Primary Examiner* — Stanley K Hill
(74) *Attorney, Agent, or Firm* — Ziv Glazberg

(57) ABSTRACT

A computer-implemented method, apparatus and product for solving a Constraint Satisfaction Problem (CSP). The computer-implemented method, performed by a computerized device, comprising: obtaining the CSP comprising a set of variables, a set of corresponding domains, and a set of constraints; and solving the CSP by iteratively: limiting the domains to exclude values that cannot satisfy one or more constraints of the set of constraints; heuristically selecting a variable out of the set of variables, wherein said heuristically selecting is based on constraint semantics of a constraint of the set of constraints; and limiting a corresponding domain of the selected variable.

14 Claims, 3 Drawing Sheets

CONSTRAINT SATISFACTION PROBLEM SOLVING USING CONSTRAINT SEMANTICS

TECHNICAL FIELD

The present disclosure relates generally to solving Constraint Satisfaction Problems (CSP) and, more particularly to heuristics utilized during CSP solving.

BACKGROUND

A CSP may be defined as a triplet P=<V, D, C>, involving a set of variables, $V=\{v_1, \ldots, v_n\}$, which take discrete values from their corresponding finite domains $D=\{D_{v1}, \ldots, D_{vn}\}$, and a set of constraints $C=\{C_1, \ldots, C_m\}$. A constraint is an entity that restricts the values of one or more variables it relates to. For example, a constraint may be $C_1 > C_2 + C_3$. As another example, a constraint may be $(C_1 > C_2)$ OR $(C_3 < C_4$ AND $C_1 = 5)$. The constraint may utilize arithmetic operators, logic operators, or the like. In some exemplary embodiments, constraints may be presented as first order logic formulas over the variables.

A solution to the CSP problem is a single assignment of each variable such that the value of the variable belongs to its corresponding domain, and all the constraints are satisfied.

One of the known solving techniques for CSP is Maintain Arc Consistency (MAC), which is described in Dechter R., "Constraint Processing" (USA) 2003, which is hereby incorporated by reference. In the MAC paradigm, CSP is solved by repeatedly performing two steps: (1) propagation and (2) instantiation.

The propagation step comprises restricting the domain of the variables to valid alternatives based on the constraints. Given a single constraint (formula/relation) and a set of variables values, a propagator reduces the domain of the variables, removing values that cannot be combined with any set of values from the other variables to satisfy the constraint. If none of the values is legal, a backtracking step is invoked.

The instantiation step is performed after the propagation step completes all possible propagations in each constraint alone (Arc). A variable is chosen and instantiated to a single value or sub-domain out of the current domain.

The instantiation has an impact on solver efficiency and the time it takes for the solution to be determined. Heuristics may be applied to reduce the number of backtracks and to gain performance speed-up. Many different types of heuristics are known in the literature, such as selecting the variables based on an order defined based on a constraint network, based on variables' domains, or based on a manual definition by a user.

CSP solver may be utilized in variety fields, such as for example verification, automatic scheduling, resource allocation algorithms, or the like. Generally, CSP solver solves an NP problem, or under some constraints an NP-complete problem.

BRIEF SUMMARY

One exemplary embodiment of the disclosed subject matter is a computer-implemented method performed by a computerized device. The method comprising: obtaining a Constraint Satisfaction Problem (CSP) comprising a set of variables, a set of corresponding domains, and a set of constraints. The method further comprising solving the CSP by iteratively: limiting the domains to exclude values that cannot satisfy one or more constraints of the set of constraints; heuristically selecting a variable out of the set of variables, wherein the heuristically selecting is based on constraint semantics of a constraint of the set of constraints; and limiting a corresponding domain of the selected variable.

Another exemplary embodiment of the disclosed subject matter is an apparatus comprising: a memory unit for retaining a Constraint Satisfaction Problem (CSP) comprising a set of variables, a set of corresponding domains, and a set of constraints. The apparatus further comprising a processor operative to: obtain the CSP; solve the CSP by iteratively: limiting the domains to exclude values that cannot satisfy one or more constraints of the set of constraints; heuristically selecting a variable out of the set of variables, wherein the heuristically selecting is based on constraint semantics of a constraint of the set of constraints; and limiting a corresponding domain of the selected variable.

Yet another exemplary embodiment of the disclosed subject matter is a computer program product comprising: a non-transitory computer readable medium; a first program instruction for obtaining a Constraint Satisfaction Problem (CSP) comprising a set of variables, a set of corresponding domains, and a set of constraints; a second program instruction for solving the CSP by iteratively: limiting the domains to exclude values that cannot satisfy one or more constraints of the set of constraints; heuristically selecting a variable out of the set of variables, wherein the heuristically selecting is based on constraint semantics of a constraint of the set of constraints; and limiting a corresponding domain of the selected variable; and wherein the first and second program instructions are stored on the non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
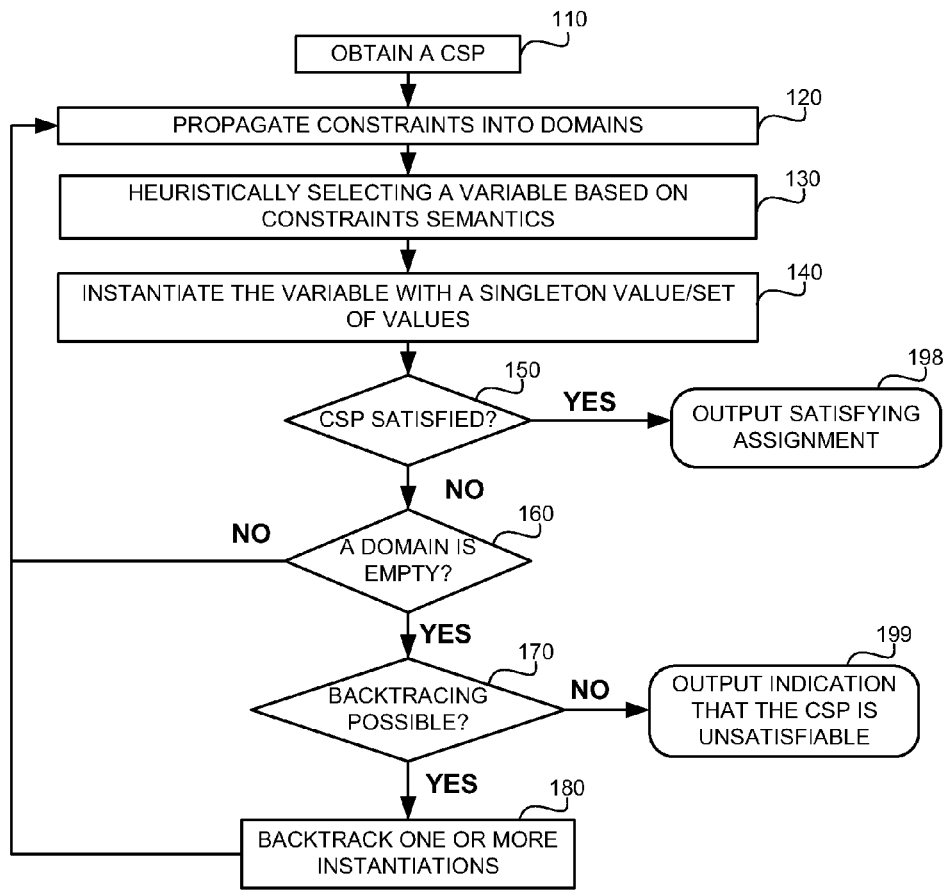
FIGS. 1A and 1B show flowchart diagrams of steps in a method for CSP solving, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to provide a heuristic for selecting a variable to be instantiated in a MAC-based CSP solver. Another technical problem is to provide a heuristic for value selection of the variable.

A person of ordinary skill in the art would appreciate that the variable/value selection heuristic may have a significant impact on the efficiency of the CSP solver. In particular, in a satisfiable CSP, the heuristic may impact resource utilization of the CSP solver, including, but not limited to time, memory, processor utilization, and other resources.

One technical solution is to heuristically select a variable based on constraint semantics. In some exemplary embodiments, constraint semantics may refer to semantic aspects of a constraint of the CSP. In particular, interpreting how basic tokens of the constraint (e.g., variables, values, and operators) are connected together to form a constraint.

Another technical solution is to identify alternative sub-constraints within the constraints which are connected by a decidable operator, and utilize one or more of the sub-constraints as the basis for variable/value selection heuristic.

The decidable operator semantically defines that out of a plurality of sub-constraints associated with the decidable operator only a sub-portion is required to be satisfied in order to that the expression defined by the decidable operator will be satisfied. In some exemplary embodiments, a decidable operator, is, therefore considered as allowing a degree of flexibility of which sub-constraints should be satisfied and which can be falsified.

As a non-limiting example, the following may be decidable operators: disjunctive operator (e.g., OR, $\vee$, $\cup$), imply operator (e.g., $\rightarrow$), if and only if operator (e.g., $\leftrightarrow$), counter operator (e.g., numOf), alternative assignment operator, or the like.

A counter operator, such as numOf operator, may be defined as a number of its associated sub-constraints that are satisfied. For example, numOf(i,0,9,v[i]=1)>0 defines 10 sub-constraints (v[0]=1, v[1]=1, v[2]=1, ..., v[9]=1) and constraints that the number of sub-constraints that are satisfied should be greater than 0. A constraint on the counted value may be satisfied even in case some of the sub-constraints are falsified. For example, in the example given above, even in case the sub-constraint v[0]=1 is falsified (e.g., v[0] is assigned a different value than 1), the constraint may still be satisfied. It will be appreciated that the numOf operator may not necessarily be defined with respect to a vector and other manners of defining a set of sub-constraints may exist. In addition, other types of counter operators may be utilized.

An alternative assignment operator may be defined as a set of alternative assignments or comparisons, such that at least some of the alternatives are in effect. For example, a list of alternative assignments/comparisons of values may be provided (e.g., (a=1, a=2, b=1, c=1)). In some cases the alternatives may exclude one another (e.g., either a=1 or a=2), or not exclude one another (e.g., both b=1 and c=1 may be satisfied). In some exemplary embodiments, an alternative assignment operator is a relation over a set of variables providing a set of alternative assignments to the variables. The alternative assignments may be provided in the form of a tuple. For example, over the set of variables (a,b,c) an alternative assignment operator may define the set of tuples {(1,1,1), (1,2,3), (9,8,7)} as alternative assignments to one another. Thereby, (a,b,c) are defined to be set to either (a=1,b=1,c=1), (a=1,b=2, c=3) or (a=9,b=8,c=7).

Yet another technical solution is to dynamically determine, based on the domains of the variables, whether statically decidable operator is dynamically decidable. Consider the constraint (a=1 or b>a), while this constraint may appear to be decidable, in case the domains of b and a do not allow for the sub-constraint b>a to be satisfied, the constraint is equivalent to (a=1 or FALSE) which is equivalent to (a=1). In this example, the statically decidable operator is non-decidable when the corresponding domains are taken into account. The domain may be the initial domain of the CSP, a limited domain based on constraint propagation, a limited domain further based on variable instantiations, or the like. It will be noted that a decidable operators may be transformed into non-decidable during the CSP solving procedure and, after backtracking some instantiation, may be transformed back into decidable operators.

Yet another technical solution is to heuristically select a value or range of values of a variable based on a reduced domain in case the sub-constraint is satisfied.

Yet another technical solution is to heuristically select constraint, sub-constraint, and variable of the sub-constraint to be utilized for selecting a variable to instantiate. In some embodiments, during an iterative process of propagation and instantiation, heuristic choices are biased to be substantially similar, such as the same constraint as before, the same sub-constraint as before, the same variable as before, and the like.

One technical effect of utilizing the disclosed subject matter is gaining a performance speedup and reduction of resources required for CSP solving in some cases. It will be appreciated that the disclosed subject matter may be more effective on some CSP instances than others. Moreover, in some CSP instances, the disclosed subject matter may perform worse than prior art CSP solving techniques.

Another technical effect is providing a variable selection order which is based on context of usage of the variables in the constraints. In some embodiments, the heuristic may be operative to assist in satisfying a constraint or determining that it is unsatisfiable within a relatively small number of instantiation steps.

Yet another technical effect is being able to determine a satisfying assignment in CSPs that under prior-art techniques would not be solved within a reasonable amount of time. As the CSP solver is an NP problem, solving the CSP may require non-polynomial time with respect to the size of the problem. Given a large enough problem, solving CSP may not be reasonably feasible. The disclosed subject matter may, in some cases, enable determining a satisfying solution to such CSP within feasible time.

Yet another technical effect is, in some cases, to reduce the number of backtracks while solving the CSP with comparison to other prior art CSP solving techniques.

Referring now to FIG. 1A showing a flowchart diagram of steps in a method for CSP solving, in accordance with some exemplary embodiments of the disclosed subject matter.

In step 110, a CSP is obtained. The CSP may be retained in a computerized readable form using a computer-readable medium. In some exemplary embodiments, a constraint of the CSP may be provided using mathematical expression in first-order logic. The constraint may be composed of variables, operators, constants, connectives, and the like. Additionally or alternatively, a constraint of the CSP may be provided using explicit enumeration of the tuples that satisfy the constraint. In some cases, the width of the tuple is the arity of the constraint. For example, in a constraint having three variables, the tuples may have a width of three.

In step 120, constraints may be propagated into the domains. Propagation may exclude illegal values from the domains based on the constraints. For example, in case of a constraint (a>10), then all values in the corresponding domain that do not satisfy the constraint may be removed from the domain. Step 120 may comprise iterative process of propagation, wherein in response to a reduction of the domain of a first variable, a reduction may be performed in the domain of a second variable. In some cases, consecutive reductions may occur in the same domain. For example, in response to the reduction of the domain of the second variable, an additional reduction may be performed with respect to the domain of the first variable.

In step 130, optionally after no additional constraint propagations may be performed, a variable may be selected heuristically. The variable is selected for the purpose of instantiating it with a subset of its domain (step 140), and thus the quality of the heuristic may be important for performance. The variable may be selected heuristically based on a constraint semantic of one or more constraints of the CSP. The semantic of the connectivity between sub-constraints of the constraint may be taken into account for the selection heuristic.

Utilizing semantic analysis of the constraint, the selected variable may have some impact on satisfying a constraint. Therefore, faster determination of satisfying assignment may be achieved.

In step 140, the selected variable may be instantiated. The corresponding domain of the selected variable may be reduced to a subset of the domain. Optionally, the subset is a singleton value. Alternatively, the subset is a set of values.

In some exemplary embodiments, the subset of the domain may be determined based on semantic analysis of the constraint. In some exemplary embodiments, the subset may be a set of values for which a sub-constraint of a decidable is guaranteed to be satisfied.

In step 150, the CSP is examined to see if the current domains guarantee that all constraints are satisfied. In case they do, a single satisfying assignment may be determined (e.g., in case the domains provide some alternative values) and the assignment may be outputted in step 198.

Otherwise, in step 160, a determination whether any of the domains is empty may be performed. If no empty domain is determined steps 120-140 may be performed again. An empty domain is an indication that the CSP cannot be satisfied. However, in some cases, the CSP becomes unsatisfiable due to some heuristic choice (e.g., steps 130, 140), and the heuristic choice may be backtracked (step 180), if possible (step 170). If, however, no backtracking is possible, either because there were no heuristic choices or because all alternatives were exhausted, an indication that the CSP is unsatisfiable may be outputted (step 199).

In some embodiments, empty domains may be determined in response to constraint propagation (step 120), instead of or in addition to in response to instantiations (step 140).

Figure 1B:
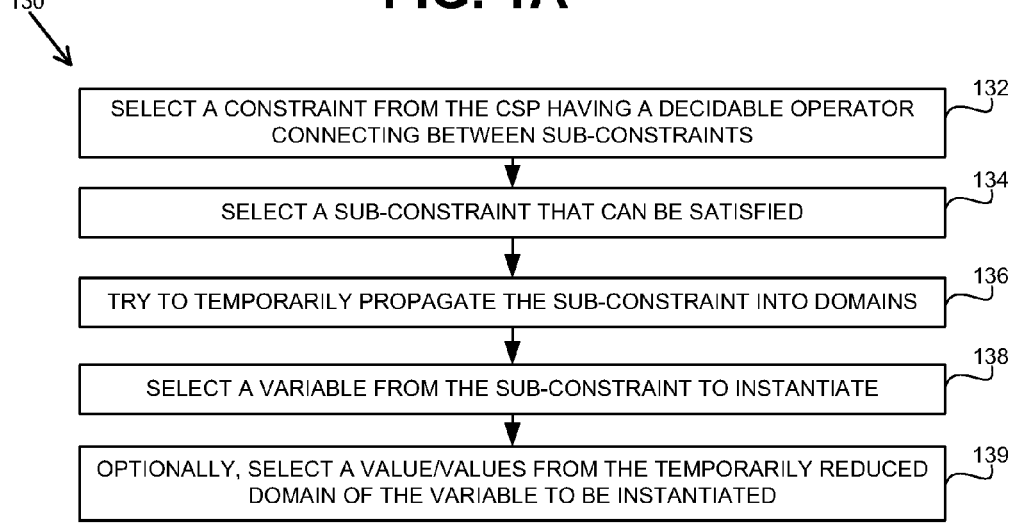

Referring now to FIG. 1B showing one exemplary embodiment of step 130 of FIG. 1A, in accordance with the disclosed subject matter.

In step 130', a heuristic selection of variable and/or value is performed based on constraints semantics.

In step 132, a constraint is selected. The constraint may be selected out of the plurality of the constraints of the CSP. The constraint may comprise a portion having a decidable operator connecting, or otherwisely referring to, two or more sub-constraints. In some exemplary embodiments, the decidable operator is an operator statically known to be decidable. In some exemplary embodiments, dynamic determination of whether the operator is a decidable operator may be performed. The decidable operator may be an operator that under the domains of the CSP allows to at least one of the sub-constraints to be falsified and still cause the portion to be satisfied.

In some exemplary embodiments, a decidable operator is an operator providing a degree of freedom. A truth value of the portion consisting of the decidable operator and its sub-constraints may be true even in case one or more of the sub-constraints are falsified. This allows a solver to select one of the sub-constraints and cause its value to be true by instantiating one or more relevant variables. The solver is able to make a determination between two or more different options. As another example, an iff operator requires that either both sub-constraints be true or both be false. The degree of freedom is in the solver's ability to choose which value both sub-constraints will receive. In some exemplary embodiments, the degree of freedom may be in the selection of value to both sub-constraints (e.g., true or false). Alternatively, the iff operator may be transformed into a disjunction operator as follows: A iff B may be transformed to $(A \land B) \land (\lor A \neg A \neg B)$. Thereby, the degree of freedom is in the selection of which sub-constraint to hold $((A \land B)$ or $(\neg A \land A \neg B))$.

In step 134, a decision based on the degree of freedom provided by the decidable operator may be performed. As an example, a single sub-constraint that can be satisfied (but is not guaranteed to be satisfied) may be selected between a plurality of alternative possibilities.

Optionally, in step 136, constraint propagation may be temporarily performed under an assumption in accordance with the decision of step 134. For example, in case step 134 selects a sub-constraint to be satisfied, the sub-constraint may be referred to as a constraint that has to be satisfied (i.e., as a separate constraint), and based on such an assumption, additional propagation that did not occur in previous step 120 may now occur. The results of the temporarily propagation may be revoked (or otherwisely not saved) afterwards, and before the following propagation of step 120.

In step 138, a variable from the sub-constraint may be selected to be instantiated. Optionally, a variable whose domain was reduced during the propagation of step 136 may be selected and preferred over a variable whose domain was not reduced. In case several variables have reduced domains, the variable having a domain having a smallest number of values may be selected. Alternatively, the variable having a most significant reduction (either in absolute or proportional terms) may be selected. In some exemplary embodiments, the selection may be based on a combination of the above, on a cone-of-influence analysis, on a constraint map, or the like. Additionally or alternatively, an arbitrary selection may be made.

Optionally, in step 139, a suggested instantiation may be provided. The suggested instantiation may be to a singleton value or to a set of values. The suggested instantiation may be to the reduced domain of the variable based on the propagation of step 136. Additionally or alternatively, the suggested instantiation may be a singleton value of the reduced domain.

In some exemplary embodiments, in consecutive or substantially consecutive iterations of the propagation-instantiation loop (steps 120-140), the selections of step 132, 134, and 138 may be biased toward consistency. Consistency may be when the same constraint, the same sub-constraint, or/and the same variable is selected in consecutive iterations. In some exemplary embodiments, consecutive iterations allow for handling the same issue until it causes a conflict or until it can be resolved without scattering to handle different issues.

Figure 2A:
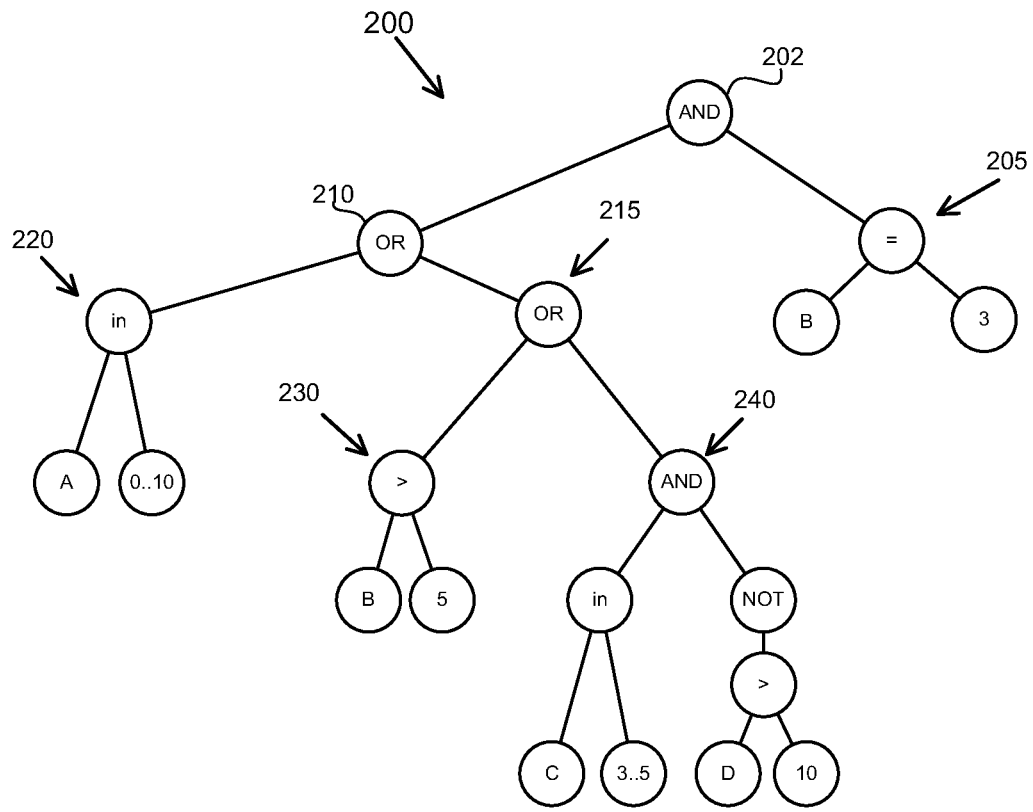
FIGS. 2A and 2B show diagrams of a graph of a constraint having a decidable operator, in accordance with some exemplary embodiments of the disclosed subject matter.

Referring now to FIG. 2A showing a diagram of a graph of a constraint having a decidable operator, in accordance with some exemplary embodiments of the disclosed subject matter.

A tree 200 shows a representation of the following constraint: $((A \in [0 \ldots 10] \lor B > 5 \lor (C \in [3 \ldots 5] \land \neg(D > 10))) \land B=3)$. A leaf in the tree is a variable, constant, range of constants, or the like. A non-leaf node is an operator. Some operators are decidable operators, while some are non-decidable operator.

As can be appreciated, the AND operator in node 202 is a non-decidable operator as there is it does not provide any degree of freedom. In order for the constraint 200 to be satisfied, both sub-constraints represented by both sub-trees of the node 202 (a sub-tree beginning in node 210 and a sub-tree 205) must be satisfied.

The sub-tree of node 210 provides a degree of freedom. In order for the sub-tree to be satisfied one of its sub-trees (220, 215) must be satisfied, while the other may be either satisfied or falsified. Therefore the OR operator of node 210 is a decidable operator.

Similarly, the OR node of sub-tree 215 is also a decidable operator as it is sufficient that only one of its sub-trees (230, 240) be satisfied in order for the sub-tree 215 to be satisfied.

It will be noted that although statically it may be understood that the OR operator of sub-tree 215 has two alternatives, it is not the case when the sub-tree is inspected dynamically. Assuming the domain of B is $\{3\}$ (e.g., as mandated by the sub-tree 205), the sub-tree 230 is falsified. Hence, in order for the sub-tree 215 to be satisfied, sub-tree 240 must be satisfied. The OR operator of sub-tree 215 can be dynamically deemed non-decidable.

Dynamic inspection may provide one of three possibilities for each constraint (e.g., constraint 202, sub-constraint of sub-tree 240, etc.): (1) constraint is satisfied; (2) constraint is falsified; (3) undetermined: both possibilities can be viable. Dynamic inspection may take into account the domains of the variables to see which possibility occurs. For example, consider constraint of the sub-tree 230: B>5. In case the domain of B is [8...10] then the constraint is satisfied, as for each value of B out of the domain [8...10], the constraint B>5 is held. Alternatively, if the domain of B is [−10...−2, 1...3] then the constraint is falsified. Alternatively, if the domain of B is [0...10] the constraint is undetermined as a first value of the domain (e.g., 3) causes the constraint to be falsified, while a second value of the domain (e.g., 10) causes the constraint to be satisfied. In some exemplary embodiments, decidable operators may be useful in accordance with the disclosed subject matter, in case one or more constraints are undetermined.

It will be noted that in the sub-tree 240, there is a non-decidable operator (AND operator). Nonetheless, the decidable property of node 210 is maintained.

Figure 2B:
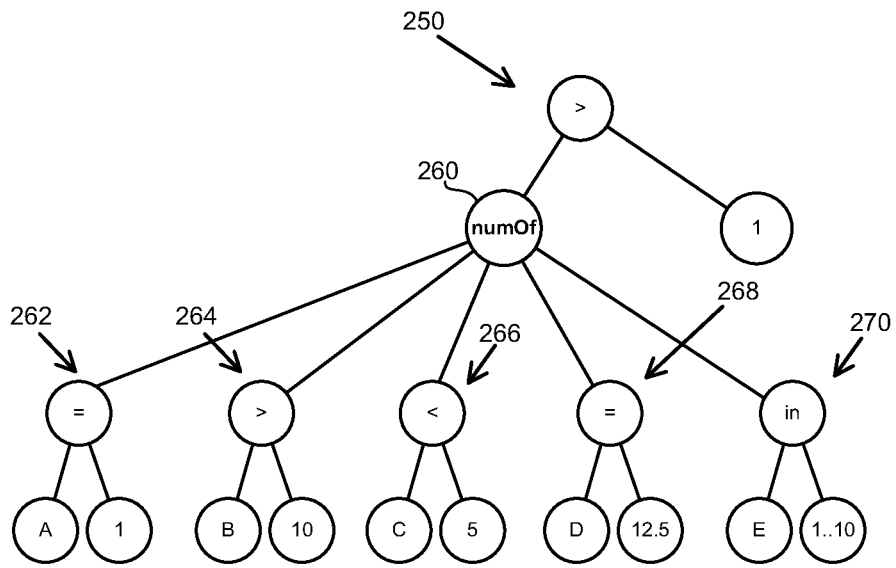

In some exemplary embodiments, operator nodes may comprise more than two sub-trees, as is exemplified in FIG. 2B. A constraint is represented using a tree 250. NumOf operator node 260 provides a degree of freedom, whereas in order for the constraint to be satisfied it is sufficient that two or more of the sub-trees 262, 264, 266, 268, 270 be satisfied.

Figure 3:
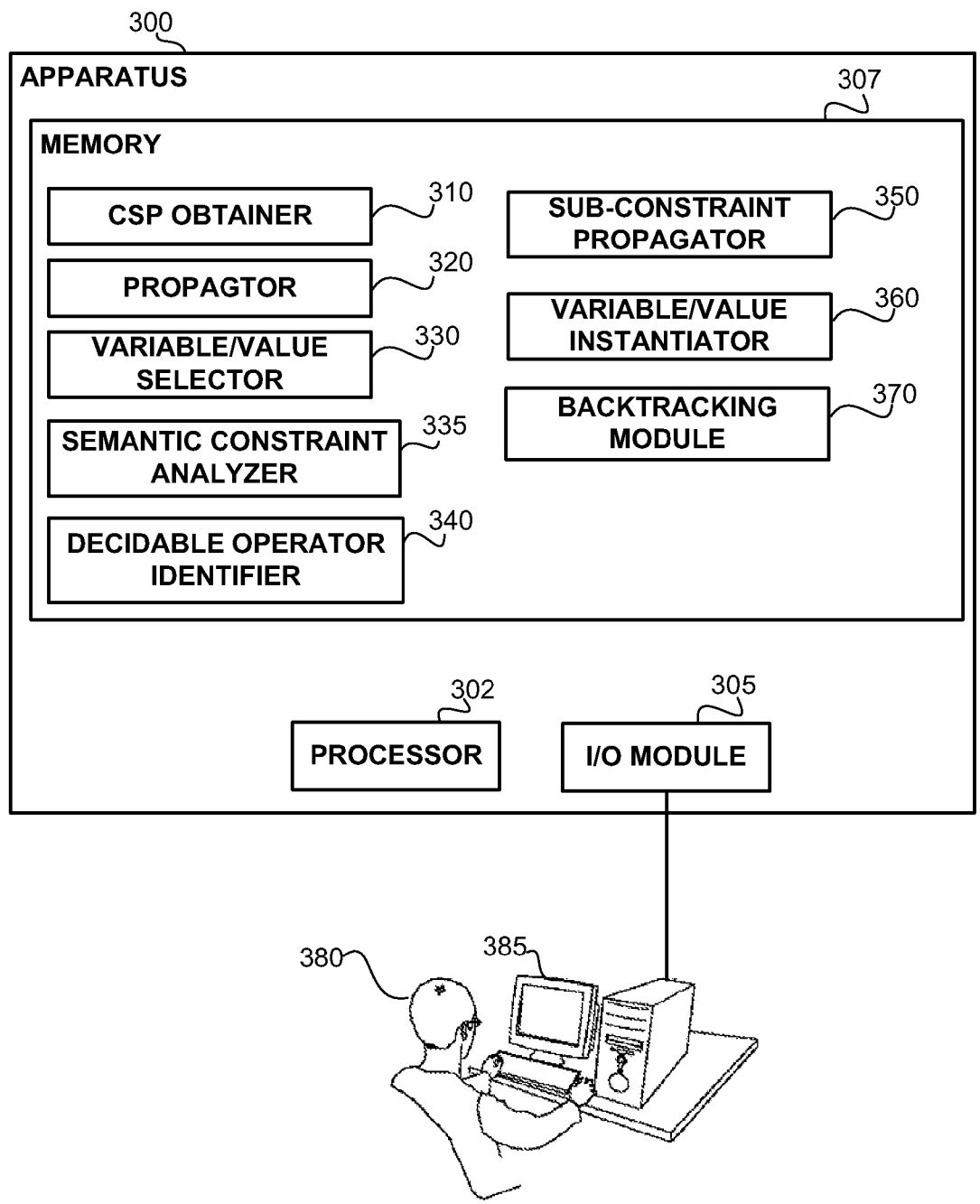
FIG. 3 shows a block diagram of components of a computerized CSP solver, in accordance with some exemplary embodiments of the disclosed subject matter.

Referring now to FIG. 3 showing a block diagram of components of a computerized CSP solver, in accordance with some exemplary embodiments of the disclosed subject matter. An apparatus 300 may be a computerized apparatus adapted to perform a method such as depicted in FIGS. 1A and/or 1B.

In some exemplary embodiments, apparatus 300 may comprise a processor 302. The processor 302 may be a Central Processing Unit (CPU), a microprocessor, an electronic circuit, an Integrated Circuit (IC) or the like. Alternatively, the apparatus 300 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). The processor 302 may be utilized to perform computations required by the apparatus 300 or any of it subcomponents.

In some exemplary embodiments of the disclosed subject matter, the apparatus 300 may comprise an Input/Output (I/O) device 305 such as a terminal, a display, a keyboard, an input device or the like to interact with the system, to invoke the system and to receive results. It will however be appreciated that the system can operate without human operation.

In some exemplary embodiments, the I/O module 305 may be utilized to provide an interface to a user 380, which may utilize a Man-Machine Interface (MMI) 385, to interact with the apparatus 300, such as by reviewing results, logs and the like, providing commands, CSPs, rules, preferences or the like, or interacting in any similar manner.

In some exemplary embodiments, apparatus 300 may comprise a computerized memory 307. The memory 307 may be persistent or volatile. For example, the memory 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, the memory 307 may retain program code operative to cause the processor 302 to perform acts associated with any of the steps shown in FIGS. 1A and/or 1B above. In some exemplary embodiments, the memory 307 may retain the CSP, information useful for backtracking heuristic instantiations, reduced domains of the CSP based on propagation and/or instantiation, and the like.

The components detailed below may be implemented as one or more sets of interrelated computer instructions, executed for example by the processor 302 or by another processor. The components may be arranged as one or more executable files, dynamic libraries, static libraries, methods, functions, services, or the like, programmed in any programming language and under any computing environment.

a CSP obtainer 310 may be configured to obtain a CSP. The CSP may be obtained from a user, from a computerized tool via a predetermined interface, from a computer-readable medium, or the like. In some exemplary embodiments, the apparatus 300 may be utilized in assisting verification of a target computer system. The apparatus 300 may obtain a CSP defined in relation with a verification task from a verification apparatus. The CSP obtainer 310 may be adapted to perform a step such as 110 of FIG. 1A.

A propagator 320 may be configured to propagate constraints into domains, such as performed in step 120 of FIG. 1A.

A variable/value selector 330 may be configured to heuristically select a variable to be instantiated. Optionally, the variable/value selector 330 may be configured to heuristically select a value or a set of values for the instantiated variable. The variable/value selector 330 may be configured to perform step 130 of FIG. 1A, and may be useful for performing step 140 of FIG. 1A. Additionally or alternatively, the variable/value selector 330 may be useful for performing step 138 and/or 139 of FIG. 1B.

A semantic constraint analyzer 335 may be operative to analyze constraints from a semantic point of view. Based on the semantic analysis of the constraint, the variable/value selector 330 may select variable and/or value. Optionally, the semantic constraint analyzer 335 may select a constraint to analyze (e.g., as in step 132), and may select a sub-constraint (e.g., as in step 134).

A decidable operator identifier 340 may be operative to identify a constraint having a decidable operator. The decidable operator identifier 340 may be operative to identify statically decidable operator. Additionally or alternatively, the decidable operator identifier 340 may be operative to identify dynamically decidable operator based on domains associated with each variable.

A sub-constraint propagator 350 may be operative to propagate a sub-constraint as if it was a constraint. When used with respect to a sub-constraint which is associated with a decidable operator, non-mandatory propagations may occur. In some exemplary embodiments, a copy of the sub-constraint may be created and the propagator 320 may be utilized on the copy. Alternatively, the domains may be saved and the propagator 320 may be utilized on the sub-constraint. The saved domains and the determined domains may be compared to see whether any of the domains were reduced. The saved domains may be utilized to revoke non-mandatory limitations on the domains. In some exemplary embodiments, based on a reduction of a domain, the variable/value selector 330 may select a variable associated with the reduced domain and/or a value associated with the reduced domain. Additionally or alternatively, the reduced domain may be selected by the variable/value selector 320 for instantiation. In some exemplary embodiments, the sub-constraint propagator 350 may perform a step, such as, step 136 of FIG. 1B.

A variable/value instantiator 360 may be configured to instantiate a selected variable with a selected one or more values, in accordance with the selections of the variable/value selector 360. In some exemplary embodiments, the variable/value instantiator 360 may be operative to perform step 140 of FIG. 1A.

A backtracking module 370 may be operative to backtrack heuristic instantiations. In some exemplary embodiments, the backtracking module 370 may be invoked in response to a determination that the CSP is not solvable in view of an instantiation or outcome thereof. The backtracking module 370 may be operative to perform steps such as 170, 180 of FIG. 1A.

Consider the following example, which exemplifies some added value of utilizing constraint semantic in heuristic determination: A CSP comprises of a vector of 10 entries v[1 . . . 10], each entry having a domain of [1 . . . 100]. The constraints in the CSP are as follows: numOf(i, 1, 10, v[i]=1)>0 (i.e., at least one of the variables in the vector has the value 1). numOf(i, 1, 10, v[i]=2)>0 (i.e., at least one of the variables in the vector has the value 2). numOf(i, 1, 10, v[i]=3)>0 (i.e., at least one of the variables in the vector has the value 3). numOf(i, 1, 10, v[i]=4)>0 (i.e., at least one of the variables in the vector has the value 4). numOf(i, 1, 10, v[i]=5)>0 (i.e., at least one of the variables in the vector has the value 5).

It will be appreciated that although a human being can easily determine a satisfying assignment to the CSP (e.g., v=[1,2,3,4,5,1,1,1,1,1]), a computerized CSP solver may highly depend on a utilized heuristic in order to succeed in determining a satisfying assignment.

Using prior art heuristics, there is low chance to solve this problem, especially when the number of entries, domains and constraints is large.

The disclosed subject matter enables the CSP solver to identify that any of the entries can be set to 1, any of the remaining entries can be set to 2, any of the remaining entries can be set to 3, and so forth. In accordance with the disclosed subject matter, a satisfying assignment may be determined relatively fast. Furthermore, semantic analysis may enable solving this CSP without any backtracking.

It will be noted that in accordance with the disclosed subject matter a constraint is selected, semantically analyzed and serves as a basis for instantiation. Therefore, it is not required that a CSP solver in accordance with the disclosed subject matter solve the CSP by first satisfying the first constraint, but rather may order the constraints in a different order.

In accordance with the disclosed subject matter the following pseudo code for heuristic selection of a variable may be utilized:
1. Insert all non satisfied constraints to set C;
2. While (C not empty) {
3. select CurrentC from C;
4. Iterate over a semantic tree of the CurrentC, starting from the root, until a value is returned:
   a. determine whether the node is decidable operator;
   b. if the node is non-decidable, recursively iterate over each children of the node, if one or more suggestions are provided, select one suggestion and return it.
   c. otherwise, if the node is an atom not associated with an operator, return "no suggestion".
   d. otherwise, if the node is decidable, for each child of the node, check is Satisfied for it.
      i. In case there is only one option to satisfy the constraint (i.e., the operator is dynamically non-decidable), iterate recursively with this option as with statically a non-decidable operator;
      ii. otherwise, if the node has more than one option to be satisfied, select one option and based thereof:
         create a copy of the sub-constraint as a constraint having fresh variables with replicated domains as in the CSP;
         propagate constraints on the copy of the sub-constraint; if no legal propagation can be made, select a different option, if all options were exhausted—return "no suggestion".
         if there exists a variable having reduced domain with respect to the domain that was replicated, return "suggestion" together with the variable and a suggested value out of the reduced domain;
         Otherwise, randomly or heuristically select one of the copied variables and return "suggestion" with the selected variable.
   e. In case the node is a NOT operator, iterate over the child node of the NOT operator, while making sure that each operator has a complement behavior. Return the suggestion returned in respect to the child node.

5. If a suggestion is returned from iterating the tree, return the suggestion.
6. remove CurrentC from C}
7. return "no suggestion"

IsSatisfied is a function operative to return either "yes", "no", or "maybe", depending on whether a portion of a constraint is satisfied ("yes"), falsified ("no") or underdetermined ("maybe").

In some exemplary embodiments, constraint, option and variable selections may be saved and reused for consistency or for biasing towards consistency in substantially consecutive iterations.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
 obtaining a Constraint Satisfaction Problem (CSP) comprising a set of variables, a set of corresponding domains, and a set of constraints;
 solving the CSP by iteratively:
  limiting the domains to exclude values that cannot satisfy one or more constraints of the set of constraints;
  heuristically selecting a variable out of the set of variables, wherein said heuristically selecting is based on constraint semantics of a constraint of the set of constraints, wherein said heuristically selecting the variable based on constraint semantics comprises:
identifying in the constraint a decidable operator connecting at least a sub-constraint and an additional sub-constraint; and
selecting the variable from the sub-constraint; and
limiting a corresponding domain of the variable.

2. The computer-implemented method of claim 1, further comprising:
reducing a domain associated with the variable based on the sub-constraint and an assumption that the sub-constraint is held, whereby a reduced domain is determined; and
wherein said selecting the variable comprises selecting a variable associated with the reduced domain.

3. The computer-implemented method of claim 2, wherein said limiting the corresponding domain comprises limiting the corresponding domain to the reduced domain.

4. The computer-implemented method of claim 2, wherein said limiting the corresponding domain comprises limiting the corresponding domain to a singleton value comprised by the reduced domain.

5. The computer-implemented method of claim 1, wherein the decidable operator is selected from the group consisting of a disjunction operator, an implication operator, an if and only if operator, a counter operator and an alternative assignments operator.

6. The computer-implemented method of claim 1, wherein said identifying the decidable operator comprises:
identifying an operator connecting between a plurality of sub-constraints;
determining that two or more sub-constraints out of the plurality of sub-constraints can be satisfied using values selected from the domains; and
determining that the constraint is satisfiable under the condition that one or more of the two or more sub-constraints is falsified.

7. The computer-implemented method of claim 1, wherein the set of domains comprises at least one non-binary domain.

8. The computer-implemented method of claim 1, wherein said solving further comprises backtracking non-mandatory domain limitations upon a determination that at least one variable does not have a valid value in its corresponding domain that holds the constraints.

9. An apparatus comprising:
a memory unit for retaining a Constraint Satisfaction Problem (CSP) comprising a set of variables, a set of corresponding domains, and a set of constraints;
a processor operative to:
obtain the CSP;
solve the CSP by iteratively:
limiting the domains to exclude values that cannot satisfy one or more constraints of the set of constraints;
heuristically selecting a variable out of the set of variables, wherein said heuristically selecting is based on constraint semantics of a constraint of the set of constraints, wherein the heuristically selecting the variable based on constraint semantics comprises:
identifying in the constraint a decidable operator connecting at least a sub-constraint and an additional sub-constraint; and
selecting the variable from the sub-constraint; and
limiting a corresponding domain of the variable.

10. The apparatus of claim 9, wherein the processor is further operative to:
reduce a domain associated with the variable based on the sub-constraint and an assumption that the sub-constraint is held, whereby a reduced domain is determined; and
wherein the variable selection is performed to select a variable associated with the reduced domain.

11. The apparatus of claim 9, wherein the processor is operative to limit the corresponding domain by limiting the corresponding domain to the reduced domain.

12. The apparatus of claim 9, wherein identifying the decidable operator comprises:
identifying an operator connecting between a plurality of sub-constraints;
determining that two or more sub-constraints out of the plurality of sub-constraints can be satisfied using values selected from the domains; and
determining that the constraint is satisfiable under the condition that one or more of the two or more sub-constraints is falsified.

13. The apparatus of claim 9, wherein the processor is further operative to:
backtrack non-mandatory domain limitations upon a determination that at least one variable does not have a valid value in its corresponding domain that holds the constraints.

14. A computer program product comprising:
a non-transitory computer readable medium;
a first program instruction for obtaining a Constraint Satisfaction Problem (CSP) comprising a set of variables, a set of corresponding domains, and a set of constraints;
a second program instruction for solving the CSP by iteratively:
limiting the domains to exclude values that cannot satisfy one or more constraints of the set of constraints;
heuristically selecting a variable out of the set of variables, wherein said heuristically selecting is based on constraint semantics of a constraint of the set of constraints, wherein the heuristically selecting the variable based on constraint semantics comprises:
identifying in the constraint a decidable operator connecting at least a sub-constraint and an additional sub-constraint; and
selecting the variable from the sub-constraint; and
limiting a corresponding domain of the variable; and
wherein said first and second program instructions are stored on said non-transitory computer readable medium.

* * * * *